United States Patent [19]
Birnbaum

[11] Patent Number: 5,742,719
[45] Date of Patent: Apr. 21, 1998

[54] FASTENING DEVICE FOR LIGHT WAVEGUIDES

[75] Inventor: Roland Birnbaum, Aalen, Germany

[73] Assignee: Siemens Aktiengesellschaft, Munich, Germany

[21] Appl. No.: 709,102

[22] Filed: Sep. 6, 1996

[30] Foreign Application Priority Data

Sep. 8, 1995 [DE] Germany .................. 195 33 296.2

[51] Int. Cl.⁶ ............................................. G02B 6/38
[52] U.S. Cl. .................. 385/70; 385/55; 385/76; 385/81; 385/89
[58] Field of Search .................. 385/70, 71, 75, 385/77, 81, 83, 89, 92, 56–59, 62

[56] References Cited

U.S. PATENT DOCUMENTS

| | | | |
|---|---|---|---|
| 4,167,303 | 9/1979 | Bowen et al. | 385/59 |
| 4,253,730 | 3/1981 | Logan et al. | 385/66 |
| 4,986,625 | 1/1991 | Yamada et al. | 385/55 |
| 5,134,678 | 7/1992 | Essert | 385/70 |
| 5,398,295 | 3/1995 | Chang et al. | 385/70 |

FOREIGN PATENT DOCUMENTS

| | | |
|---|---|---|
| 0 484 996 A1 | 5/1992 | European Pat. Off. . |
| 0 503 614 A1 | 9/1992 | European Pat. Off. . |
| 0 608 627 A2 | 8/1994 | European Pat. Off. . |
| 8513668 U | 5/1985 | Germany . |
| 35 26 583 | 5/1987 | Germany . |

*Primary Examiner*—Rodney B. Bovernick
*Assistant Examiner*—Hemang Sanghavi
*Attorney, Agent, or Firm*—Hill, Steadman & Simpson

[57] ABSTRACT

A fastening device, which serves for fastening and strain relief of two monomode fibers, comprises two retainer components acting independently of one another. The device includes a cuboid base member of a plastic material that has two separate bores proceeding in a longitudinal direction from one end face to the other end face. Each of said bores has a transverse slot for at least a portion of the length of the bore extending to a side wall, which transverse slot is closable by a clamp arrangement including a clamp rail to form a frictional lock on any fiber disposed in the bore and the fastening device includes a retainer plate insertable in a retainer slot extending parallel to one of the end faces to form a positive lock on a fiber disposed in the bore.

10 Claims, 2 Drawing Sheets

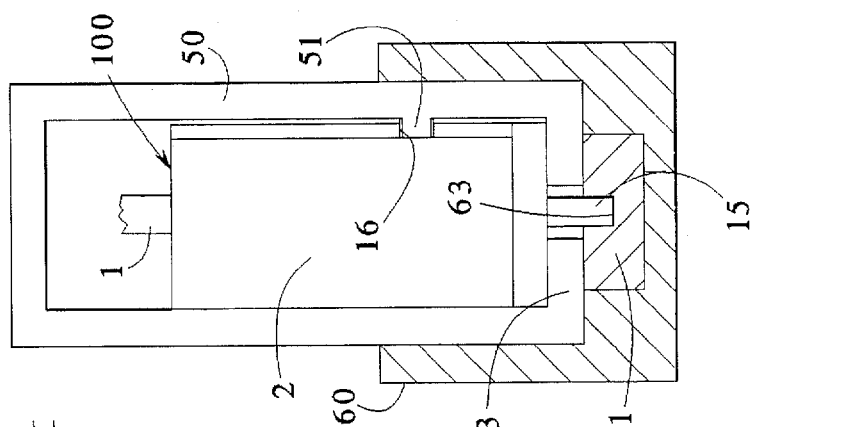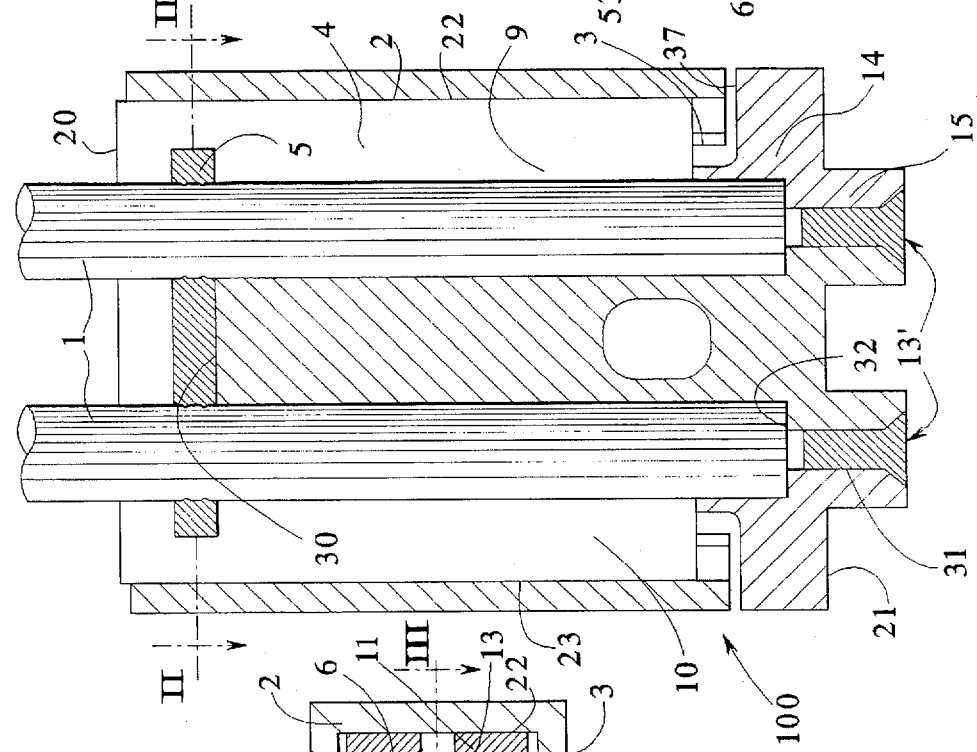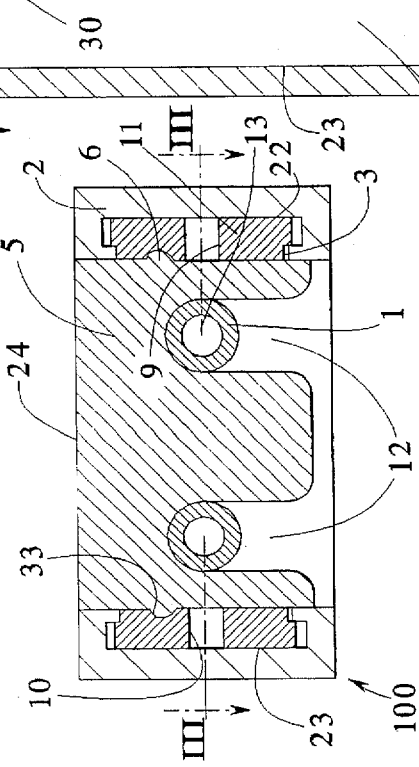

5,742,719

FASTENING DEVICE FOR LIGHT WAVEGUIDES

BACKGROUND OF THE INVENTION

The present invention is directed to a fastening device for light waveguides.

The fastening and strain relief of signal transmission cables is a problem that occurs in ever new technical contexts. Particular problems occur in view of the fastening of glass or plastic fiber cables insofar as precision demands in the micrometer range for many discrete parts and for the adjustment of individual elements relative to one another must be quite generally observed given system components for light waveguide technology.

European Published Patent Application 0 503 614 A1 discloses a strain relief device for, in particular, optical fiber cables that comprises a web or ridge part having a plurality of upwardly expanding slots that serve the purpose of a clamping and strain-relieving acceptance of the cable. This device is especially provided for use at a mounting location for cable ends which are only to be temporarily fastened and secured and then released.

A durable fastening of light waveguides in an optical plug-type connector is disclosed, for example, in European Published Patent Application 0 484 996 A1. This application discloses a plug part with a wedge or key member tapering to a point in a plug-in direction that, when plugged into a second part, thrusts between two light waveguide endings in the second or other plug part and presses these against walls of the plug part in a clamped fashion in the plugged condition. U.S. Pat. No. 4,167,303 also discloses an optical plug-type connector, wherein a plug housing comprises bores that accept the individual light waveguide cables. The actual fastening occurs with sleeves slipped over the light waveguide ends and a crimp ring respectively slipped over every sleeve that respectively radially compresses the sleeve to serve as a clamp of the waveguide.

These existing solutions are not yet satisfactory for some applications wherein a nearly 100% dependability and durability of the fastening is demanded. This is mainly because plastic parts are often employed, whose manufacture is affected by tolerances and whose material works over time. The known fastening devices are also not suitable for use in modular plug systems.

SUMMARY OF THE INVENTION

The present invention is directed to the object of creating a fastening device for light waveguides, whether a simplex or duplex lines, that assures an especially high dependability and durability, even given relatively high pulling forces on the lines. Over and above this, the fastening should be easy to assemble and easy to fabricate. The fastening should also be integratable into modularly-constructed plug-type connectors.

These objects are achieved in a fastening device for light waveguides, which device comprises a base member of plastic material having a pair of end faces connected by side walls and a retainer slot extending into the member parallel to one of the end faces, a pair of spaced bores proceeding in a longitudinal direction from the one end face to the opposite end face to receive respective monomode fibers, a slot extending from each of the bores in a transverse direction up to a respective side wall of the member over at least a part of the length of the bore, clamp means for pressing the walls of each slot together so that a fiber disposed in the bore is clamped by a frictional lock, and a retainer plate insertable in the parallel-extending retainer slot for providing additional clamping means fashioned by a positive lock.

Each of the side walls preferably has a wedge-shaped feature cooperating with the clamp means so as to form a clamping arrangement to close the slot to clamp the bore onto a fiber. In addition, the retaining plate has a pair of U-shaped clamp slots that are opened in the insertion direction for engaging and clamping the fiber disposed in the bore. Preferably, both the retaining plate and the clamp means are provided with catch means to form a positive lock between both the clamp rails and the member and the retaining plate and the member.

Other advantages and features of the invention will be readily apparent from the following description of the preferred embodiments, the drawings and claims.

BRIEF DESCRIPTION OF THE DRAWINGS

FIG. 2 is a cross sectional view taken along the line II—II of FIG. 3 of the fastening device in the assembled position and containing fiber waveguides;

FIG. 3 is a cross sectional view taken along the line III—III of FIG. 2; and

FIG. 4 is an end view with portion broken away of a plug-type connector receiving a fastening device of the present invention.

DESCRIPTION OF THE PREFERRED EMBODIMENTS

Figure 1:
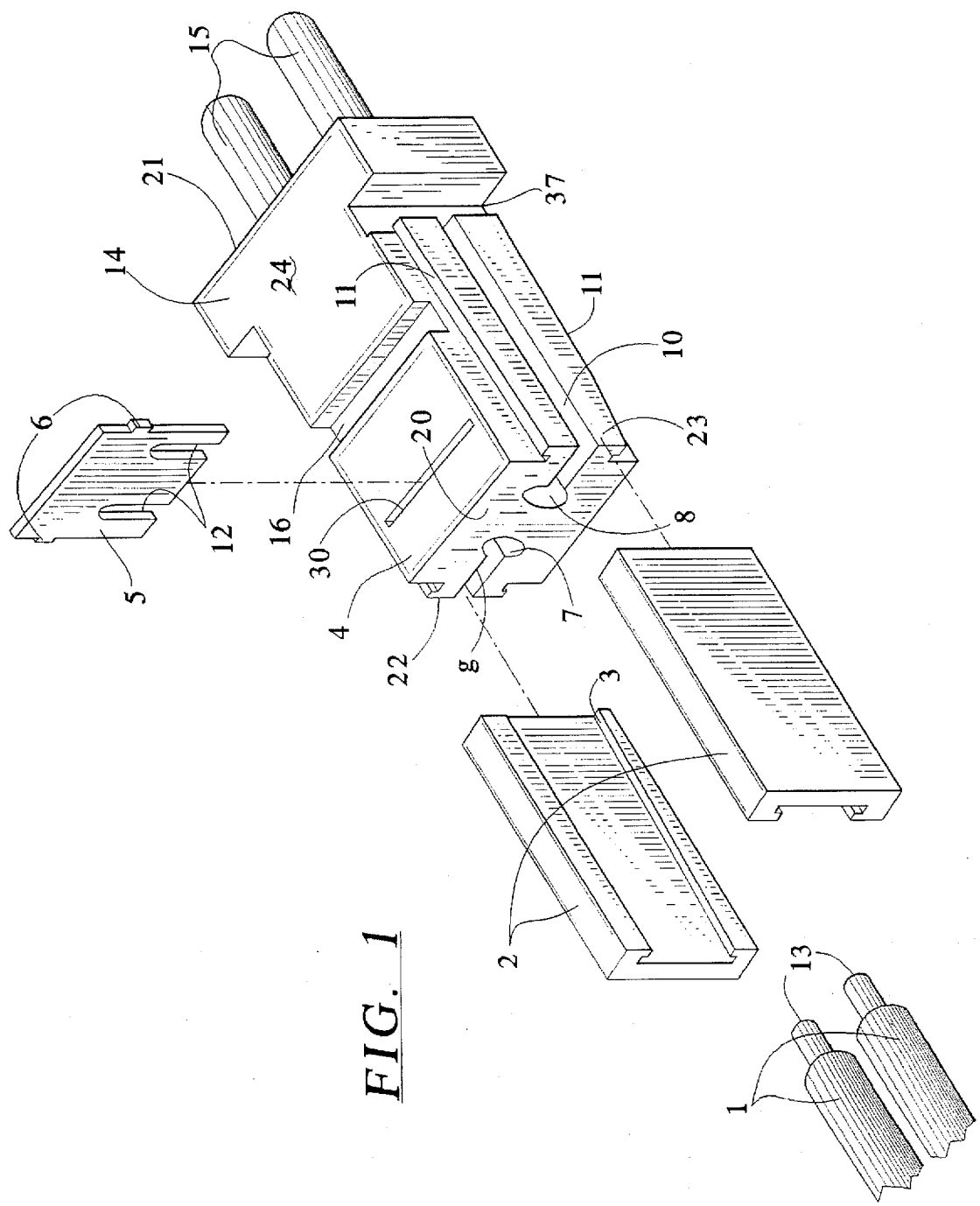
FIG. 1 is an exploded perspective view of the fastening device of the present invention.

The principles of the present invention are particularly useful in a fastening device, generally indicated at 100 in FIGS. 2–4. The fastening device includes an essentially cubold base member 4 that can be manufactured by a plastic injection process. The base member 4 has a first end face 20 and an opposite or second end face 21 with side walls 22 and 23 and a top wall 24. Adjacent the first end face 20, the member 4 has a retainer slot 30 that extends parallel to the end face 20 and extends through the base member 4.

The member 4 has two bores 7 and 8, which extend from the first end face 20 to the end face 21 and intersect the slot 30, with the portion adjacent the end face 21 having a reduced diameter portion 31 to form a shoulder or detent 32. The two bores 7 and 8 will receive monomode fiber waveguides 1, which may be either glass light waveguides as well as less complicated plastic light waveguides. Duplex lines are separated into two "discrete conductors" before the insertion. Also, before the insertion, a certain length of the cladding or jacket of the fiber waveguide 1 is removed with a stripping tool to form a bare fiber 13. The two waveguides are inserted in the bores 7 and 8 with the bare portion 13 extending into the reduced-diameter bore 31.

As illustrated in FIG. 1, the light waveguides are secured by two retaining components that act independent of one another. These two components of the fiber fastening have been realized, on the one hand, by a positive lock, on the basis of a retainer plate 5 and, on the other hand, by a friction lock that is effected by clamp means for closing lateral slots 9, 10, which extend from the bores 7 and 8 outward to the side walls 22 and 23, respectively. As shown, the clamp means can be particularly fashioned as a clamp plate or rail 2 that can be slipped onto wedge-shaped leading edge surfaces 11, which are arranged on the lateral side walls, such as 23, of the base member 4. As can be seen, the inside of the clamp plate or rail 2 has also been fashioned with a correspondingly reversed wedge shape.

As shown, the retainer plate 5 is insertable from above into a retainer slot 30 and comprises two U-shaped clamp slots 12 that are open in the insertion direction. Each slot 12 has a width slightly less than the diameter of the bores 7 or 8 so that edges of the slot 12 tightly engage the waveguide or fiber 1 (see FIGS. 2 and 3). Differing from one of the known blade/clamp connectors, however, the insulation of the fiber 1 is not cut through but is merely pressed into a clamping engagement by the edges of each of the clamp slots 12. The retainer plate 5 could also be partially inserted or pre-engaged in the base member 4 so that no additional handling of discrete parts is necessary.

A release of the retainer plate 5 is prevented by a catch hook 6, which, as illustrated in FIG. 2, engages a shoulder 33 which forms a corresponding catch means in the base member 4. A friction lock is maintained by the catch hook 3 on each of the rails 2, which hook 3 engages a shoulder formed by a groove 37 on each side of the member 4 adjacent the end region 14. The inventive fastening devices can be modified so that an intentional, subsequent release of the two retainer components is possible. For example, the retainer plate 5 can be provided with a shoulder in the region of its upper edge, this shoulder being suitable for pulling when means are provided at the same time in order, for example, to press the catch lock 6 back to an adequate extent to be released from the shoulder 33 before pulling the retainer plate 5 from the slot 30.

It can be seen in FIG. 3 that the fiber ends 13 extend into the small bores 31 as the end of the cladding engages the shoulders 32. Thus, the fiber ends 13 will extend into centering sleeves or projections 15 which extend from the end surface 21 and provide an extension for each of the bores 7 and 8. After the customizing of the light waveguides in the fastening means, for example after the engagement of the clamp plates or rails 2 and after the retainer plate 5 has been pressed in flush, the fastening device can be placed on a known rider provided therefor and can be pressed against a heatable plate, as a result whereof what is referred to as "hot-pressed" end faces of the fiber ends 13' will occur. Simply cutting off an excess end portion of the fiber ends 13, however, is also conceivable.

The disclosed fastening device 100 is especially suited for being integrated into at least one of two joinable plug housings. An especially advantageous application is a plug-type connector that comprises electrical and light waveguide plug connectors and wherein the inventive fastening device serves as a light guide module that can be inserted into a socket plug housing 50 (FIG. 4) by means of guide channels 16 engaging a rib 51. In addition, a socket module can also be inserted into socket plug housings, whereby the outside dimensions of all of the modules are identical. Such a plug-type connector is disclosed in copending U.S. patent application Ser. No. 08/708,975, claiming priority from German Patent Application 195 33 295.4 filed Sep. 8, 1995, and the disclosure of the copending U.S. Application is incorporated herein by reference thereto. In particular, the copending application discloses a socket connector housing 50 which will receive the fastening device 100 of the present invention with the sleeves or projections 15 extending through a slot 52 in a base 53 thereof. The socket connector housing 50 is plugged into a pin connector housing 60, which has a cooperative light guide module 61 integrated in a floor 62 that has centering bores 63 on an upper surface for receiving the centering sleeves or projections 15 of the fastening means 100 when the socket connector housing 50 is plugged into the pin connector housing 60.

Although various minor modifications may be suggested by those versed in the art, it should be understood that I wish to embody within the scope of the patent granted hereon all such modifications as reasonably and properly come within the scope of my contribution to the art.

I claim:

1. A fastening device for light waveguides, said device comprising a cuboid base member of plastic material having a pair of end faces interconnected by side walls, a retainer slot adjacent one end face extending parallel thereto, two separate bores intersecting the retainer slot and extending from one end face to the opposite end face for receiving monomode fibers, each of said bores having a transverse slot for at least a portion of the length of the bore extending to the adjacent side wall, clamp means for moving walls of each of said transverse slots toward each other to clamp a fiber in the bore by a frictional lock, and a retainer plate insertable into the retainer slot to form a positive lock on the fiber disposed in each of the bores.

2. A fastening device according to claim 1, wherein the clamp means is constructed as clamp rails which are slipped onto wedge-shaped leading surfaces arranged on the lateral side wall of the base member.

3. A fastening device according to claim 2, wherein the retainer plate has two U-shaped clamp slots that are open at one side of the plate in the direction of insertion of the plate into the retainer slot, each clamp slot having a width less than the bore so that edges of the clamp slot engage a waveguide in the bore.

4. A fastening device according to claim 3, wherein the retainer plate and the clamp rails are each provided with catch means coacting with the base member to maintain the frictional lock and positive lock.

5. A fastening device according to claim 1, wherein each of the bores adjacent the other end face have a reduced diameter to form a shoulder in an end region of the base member, and said base member has centering sleeves projecting axially from the end region to provide an extension of the reduced diameter bore.

6. A fastening device according to claim 1, wherein the retainer plate comprises two U-shaped clamp slots that are open in an insertion direction and have edges for tightly engaging a waveguide in the bore.

7. A fastening device according to claim 1, wherein the clamp means and the retainer plate have catch means cooperating with the base member to maintain the frictional lock and positive lock.

8. A combination of a plug-type connector with a fastening device, said plug-type connector having two joinable plug housings, said fastening device being insertable in one of said housings and having a cuboid base member of a plastic material having a first end face and a second end face connected by side walls, a retainer slot extending parallel to the first end face, two separate bores extending in the longitudinal direction from the first end face to the second end face for receiving monomode fibers, each of said bores having a transverse slot extending at least a partial length of the bore to the adjacent side wall, clamp means for clamping the transverse slots to move the surfaces of the slot toward each other to press the walls of the bore in clamping fashion on the fibers to form a frictional lock, and a retainer plate insertable into the retainer slot of the base member to additionally form a positive lock.

9. A combination according to claim 8, wherein the plug housing receiving the fastening device has a cavity essentially the same dimensions as the fastening device, said fastening device having a guide channel on the base member received on a rib of the plug housing for guiding the fastening device therein during insertion.

10. A combination according to claim 8, wherein the other of the two plug housings has a socket module for receiving centering sleeves of the base member when the one plug housing is inserted into the other plug housing.

* * * * *